United States Patent [19]

Nakano

[11] Patent Number: 5,394,352
[45] Date of Patent: Feb. 28, 1995

[54] CARRY LOOKAHEAD CIRCUIT FOR SEMICONDUCTOR INTEGRATED CIRCUIT

[75] Inventor: Masako Nakano, Kanagawa, Japan

[73] Assignee: NEC Corporation, Tokyo, Japan

[21] Appl. No.: 19,060

[22] Filed: Feb. 18, 1993

[30] Foreign Application Priority Data

Feb. 18, 1992 [JP] Japan .................. 4-029845

[51] Int. Cl.[6] .............................................. G06F 7/50
[52] U.S. Cl. .................................................. 364/787
[58] Field of Search ............... 364/768, 784, 786, 787, 364/788

[56] References Cited

U.S. PATENT DOCUMENTS

| | | | |
|---|---|---|---|
| 3,987,291 | 10/1986 | Gooding et al. | 364/787 |
| 4,761,760 | 8/1988 | Tomoji | 364/787 |
| 4,876,661 | 10/1989 | Koya | 364/787 |
| 5,117,386 | 5/1992 | Persoon et al. | 364/787 |
| 5,122,982 | 6/1992 | Cohn | 364/787 |

*Primary Examiner*—Roy N. Envall, Jr.
*Assistant Examiner*—Chuong D. Ngo

[57] ABSTRACT

A carry lookahead circuit for an operation circuit having arithmetic units includes an AND gate and an OR gate for each arithmetic unit. A lookahead carry signal to be inputted to a third arithmetic unit of the operation circuit is the output of the OR gate or the logical sum of the output of the AND gate, which is the logical product of the lookahead carry signal from the OR gate to be inputted to a second arithmetic unit and the carry condition output of the second arithmetic unit, and the carry output signal of the second arithmetic unit. This arrangement can reduce the number of AND gates used in the conventional carry lookahead circuit by two (by(m-3) for m arithmetic units) and will make possible the reduction of the chip-occupying area of the structural elements and the load capacitances of signal transfer paths in the circuit.

3 Claims, 3 Drawing Sheets

FIG. I
(PRIOR ART)

CARRY LOOKAHEAD CIRCUIT FOR SEMICONDUCTOR INTEGRATED CIRCUIT

BACKGROUND OF THE INVENTION

1. Field of the Invention

The present invention relates to a carry lookahead circuit for a semiconductor integrated circuit.

2. Description of the Related Art

FIG. 1 presents a block diagram of a conventional carry lookahead circuit for a semiconductor integrated circuit. An operation circuit 100 comprises five arithmetic units BLK0 to BLK4 connected in parallel. The processing speed of a carry lookahead circuit is restricted by the propagation time of a carry signal, which is generated as the result of an operation, from the lowest digit of each arithmetic unit to the highest digit. As the number of digits increases, the scale of the logic circuits that constitute the carry lookahead circuit becomes larger. To cope with this problem, individual arithmetic units each have a 4-bit structure and are cascade-connected to ensure an arbitrary number of bits. For instance, a binary-operation circuit having 20-bit input data A0 to A19 and B0 to B19 comprises an operation circuit 100 for performing an operation and a carry lookahead circuit 101 which looks ahead a carry signal that is input every four bits.

As mentioned above, the operation circuit 100 includes the arithmetic unit BLK0, arithmetic unit BLK1, arithmetic unit BLK2, arithmetic unit BLK3 and arithmetic unit BLK4. The arithmetic unit BLK0 has eight data input terminals A0 to A3 and B0 to B3 to receive two pieces of 4-bit data, a carry input terminal $CI_0$, a carry output terminal $CO_0$ and a carry condition output terminal $D_0$. Likewise, the arithmetic unit BLK1 has eight data input terminals A4–A7 and B4–B7, a carry input terminal $CI_1$, a carry output terminal $CO_1$ and a carry condition output terminal $D_1$. The arithmetic unit BLK2 has eight data input terminals A8–A11 and B8–B11, a carry input terminal $CI_2$, a carry output terminal $CO_2$ and a carry condition output terminal $D_2$. The arithmetic unit BLK3 has eight data input terminals A12–A15 and B12–B15, a carry input terminal $CI_3$, a carry output terminal $CO_3$ and a carry condition output terminal $D_3$. The arithmetic unit BLK4 has eight data input terminals A16–A19 and B16–B19, a carry input terminal $CI_4$, a carry output terminal $CO_4$ (CYO) and a carry condition output terminal $D_4$.

The carry lookahead circuit 101 has its 0-th bit input carry signal line connected to the carry input terminal $CI_0$ of the arithmetic unit BLK0. The carry condition output terminal $D_0$ of the arithmetic unit BLK0 and the 0-th bit input carry signal line are connected to two input terminals of an AND gate 1. The carry output terminal $CO_0$ of the arithmetic unit BLK0 and the output terminal of the AND gate 1 are connected to two input terminals of an OR gate 2. The output terminal of the OR gate 2 is connected to the carry input terminal $CI_1$ of the arithmetic unit BLK1.

The carry condition output terminal $D_1$ of the arithmetic unit BLK1 and the carry output terminal $CO_0$ of the arithmetic unit BLK0 are connected to two input terminals of an AND gate 3. The carry condition output terminal $D_1$ of the arithmetic unit BLK1, the carry condition output terminal $D_0$ of the arithmetic unit BLK0 and the 0-th bit input carry signal line are connected to three input terminals of an AND gate 4. The carry output terminal $CO_1$ of the arithmetic unit BLK1, and the output terminals of the AND gates 3 and 4 are connected to three input terminals of an OR gate 5. The output terminal of the OR gate 5 is connected to the carry input terminal $CI_2$ of the arithmetic unit BLK2.

The carry condition output terminal $D_2$ of the arithmetic unit BLK2 and the carry output terminal $CO_1$ of the arithmetic unit BLK1 are connected to two input terminals of an AND gate 6. The carry condition output terminal $D_2$ of the arithmetic unit BLK2, the carry condition output terminal $D_1$ of the arithmetic unit BLK1 and the carry output terminal $CO_0$ of the arithmetic unit BLK0 are connected to three input terminals of an AND gate 13. The carry condition output terminal $D_2$ of the arithmetic unit BLK2, the carry condition output terminal $D_1$ of the arithmetic unit BLK1, the carry condition output terminal $D_0$ of the arithmetic unit BLK0 and the 0-th bit input carry signal line are connected to four input terminals of an AND gate 14. The carry output terminal $CO_2$ of the arithmetic unit BLK2 and the output terminals of the AND gates 6, 13 and 14 are connected to four input terminals of an OR gate 15. The output terminal of the OR gate 15 is connected to the carry input terminal $CI_3$ of the arithmetic unit BLK3.

The carry condition output terminal $D_3$ of the arithmetic unit BLK3 and the carry output terminal $CO_2$ of the arithmetic unit BLK2 are connected to two input terminals of an AND gate 8. The carry condition output terminal $D_3$ of the arithmetic unit BLK3, the carry condition output terminal $D_2$ of the arithmetic unit BLK2, and the carry output terminal $CO_1$ of the arithmetic unit BLK1 are connected to three input terminals of an AND gate 9. The carry condition output terminal $D_3$ of the arithmetic unit BLK3, the carry condition output terminal $D_2$ of the arithmetic unit BLK2, the carry condition output terminal $D_1$ of the arithmetic unit BLK1 and the carry output terminal $CO_0$ of the arithmetic unit BLK0 are connected to four input terminals of an AND gate 10. The carry condition output terminal $D_3$ of the arithmetic unit BLK3, the carry condition output terminal $D_2$ of the arithmetic unit BLK2, the carry condition output terminal $D_1$ of the arithmetic unit BLK1, the carry condition output terminal $D_0$ of the arithmetic unit BLK0 and the 0-th bit input carry signal line are connected to five input terminals of an AND gate 11. The carry output terminal $CO_3$ of the arithmetic unit BLK3, and the output terminals of the AND gates 8, 9, 10 and 11 are connected to five input terminals of an OR gate 12. The output terminal of the OR gate 12 is connected to the carry input terminal $CI_4$ of the arithmetic unit BLK4.

FIG. 2 presents a block diagram of arithmetic and logic units which constitute each of the arithmetic units BLK0–BLK4. The arithmetic units BLK1–BLK4 in the operation circuit 100 each comprise arithmetic and logic units (ALUs) 21, 22, 23 and 24 which are so connected that each carry input terminal Ci receives a signal from the carry output terminal Co of the preceding stage. The ALUs 21 to 24 have data input terminals A and B to which 4-bit data An to A(n+3) (n=0, 4, 8, 12, 16) and 4-bit data Bn to B(n+3) are input. The lookahead carry signal up to the preceding arithmetic unit is input to the first ALU 21. Each of the terminals SUMs which output signals produced as the result of the operation is connected to input terminal of an AND gate 25. The output terminal D of the AND gate 25 serves as the carry condition output terminal $D_0$, $D_1$, $D_2$, $D_3$ or $D_4$ to transfer the carry signal of up to the preceding arithmetic unit forward.

The operation of the prior art circuit shown in FIG. 1 will now be described referring to FIGS. 1 and 2. The carry input terminal $CI_0$ of the arithmetic unit BLK0 receives a carry C that is input at the 0-th bit. The carry signal from the preceding stage which is to be input to the carry input terminal $CI_1$ of the arithmetic unit BLK1 is looked ahead by the output of the OR gate 2 or the logical sum of the output of the AND gate 1, which is the logical product of the carry C input at the 0-th bit and the carry condition $D_0$ of the arithmetic unit BLK0, and the carry output $CO_0$ generated in the arithmetic unit BLK0.

The lookahead carry signal from the preceding stage which is to be input to the arithmetic unit BLK2 is looked ahead by the output of the OR gate 5 or the logical sum of the output of the AND gate 4, which is the logical product of the carry C input at the 0-th bit and the carry conditions $D_0$ and $D_1$ of the arithmetic units BLK0 and BLK1 respectively, the output of the AND gate 3, which is the logical product of the carry output $CO_0$ generated in the arithmetic unit BLK0 and the carry condition $D_1$ of the arithmetic unit BLK1, and the carry output $CO_1$ generated in the arithmetic unit BLK1.

The lookahead carry signal from the preceding stage which is to be input to the arithmetic unit BLK3 is looked ahead by the output of the OR gate 15 or the logical sum of the output of the AND gate 14, which is the logical product of the carry C input at the 0-th bit and the carry conditions $D_0$, $D_1$ and $D_2$ of the arithmetic units BLK0, BLK1 and BLK2 respectively, the output of the AND gate 13, which is the logical product of the carry output $CO_0$ generated in the arithmetic unit BLK0 and the carry conditions $D_1$ and $D_2$ of the arithmetic units BLK1 and BLK2 respectively, the output of the AND gate 6, which is the logical product of the carry output $CO_1$ generated in the arithmetic unit BLK1 and the carry condition $D_2$ of the arithmetic unit BLK2, and the carry output $CO_1$ generated in the arithmetic unit BLK2.

The lookahead carry signal from the preceding stage which is to be input to the arithmetic unit BLK4 is looked ahead by the output of the OR gate 12 or the logical sum of the output of the AND gate 11, which is the logical product of the carry C input at the 0-th bit and the carry conditions $D_0$, $D_1$, $D_2$ and $D_3$ of the arithmetic units BLK0, BLK1, BLK2 and BLK3 respectively, the output of the AND gate 10, which is the logical product of the carry output $CO_0$ generated in the arithmetic unit BLK0 and the carry conditions $D_1$, $D_2$ and $D_3$ of the arithmetic units BLK1, BLK2 and BLK3 respectively, the output of the AND gate 9, which is the logical product of the carry output $CO_1$ generated in the arithmetic unit BLK1 and the carry conditions $D_2$ and $D_3$ of the arithmetic units BLK2 and BLK3 respectively, the output of the AND gate 8, which is the logical product of the carry $CO_2$ generated in the arithmetic unit BLK2 and the carry condition $D_3$ of the arithmetic unit BLK3, and the carry output $CO_3$ of the arithmetic unit BLK3.

It is apparent from the above that in the conventional carry lookahead circuit in a $(4 \times n)$-bit operation circuit, the lookahead carry signal from the preceding stage which is to be input to the m-th arithmetic unit BLK(m−1) is acquired by obtaining the logical product of the carry C input at the 0-th bit and the carry conditions $D_0$–$D_{m-2}$ from the first arithmetic unit BLK0 to the (m−1)-th arithmetic unit BLK(m−2) respectively, and for each carry output $CO_p$ ($0 \leq p \leq m-3$) of the first to (m−2)-th carry outputs $CO_0$–$CO_{m-3}$, the logical product of the associated carry signal $CO_p$ and the carry conditions $D_{p+1}$–$D_{m-2}$ of the next ((p+1)-th) arithmetic unit BLK(p+1) to the (m−1)-th arithmetic unit BLK(m−2) respectively, and then obtaining the logical sum of the individual logical products, obtained for the carry C and the respective carry outputs $CO_0$–$CO_{m-3}$, and the (m−1)-th carry output $CO_{m-2}$.

In other words, the lookahead carry signal can be expressed by $$CI_{m-1} = \{(C \cdot D_0 \cdot D_1 \cdot D_2 \cdot \ldots \cdot D_{m-2}) +$$
$$(CO_0 \cdot D_1 \cdot D_2 \cdot D_3 \cdot \ldots \cdot D_{m-2}) + \ldots +$$
$$(CO_{m-3} \cdot D_{m-2}) + CO_{m-2}\}.$$

In the conventional carry lookahead circuit in a $(4 \times n)$-bit semiconductor integrated circuit, the circuitry up to immediately before the m-th arithmetic unit BLK(m−1) or up to the (m−1)-th arithmetic unit BLK(m−2) includes $2 \times m$ AND gates and (m−1) OR gates. In addition, the AND gates 13 and 14, which are not essential in executing the carry lookahead operation, are provided to improve the operation speed of the entire carry lookahead circuit. This design undesirably increases the area the elements constituting the carry lookahead circuit occupy on the chip of the semiconductor integrated circuit. Further, the number of fan-outs of the inputs of the $2 \times m$ AND gates, namely, the carry C input at the 0-th bit, the carry outputs produced from the individual arithmetic units BLK and the carry conditions, increases to increase the load capacity of each logic gate.

SUMMARY OF THE INVENTION

It is therefore an object of the present invention to provide a carry lookahead circuit which overcomes the above-described conventional shortcomings and which can reduce the chip area of the carry lookahead circuit for a semiconductor integrated circuit and reduce the number of fan-outs of logic gates that constitute the carry lookahead circuit.

The carry lookahead circuit in a semiconductor integrated circuit according to the present invention performs carry lookahead by an OR gate or the logical sum of the output of an AND gate, which yields the logical product of a lookahead carry signal to be input to an (m−2)-th arithmetic unit at the preceding stage and the carry condition of the (m−2)-th arithmetic unit, and a carry output generated in the (m−2)-th arithmetic unit. This carry lookahead circuit therefore has fewer elements than the prior art carry lookahead circuit. Further, the number of fan-outs of the carry C input at the 0-th bit, the carry outputs produced from the individual arithmetic units and the carry conditions, decreases so that the load capacity of each logic gate can be reduced.

DETAILED DESCRIPTION OF THE PREFERRED EMBODIMENT

Figure 3:
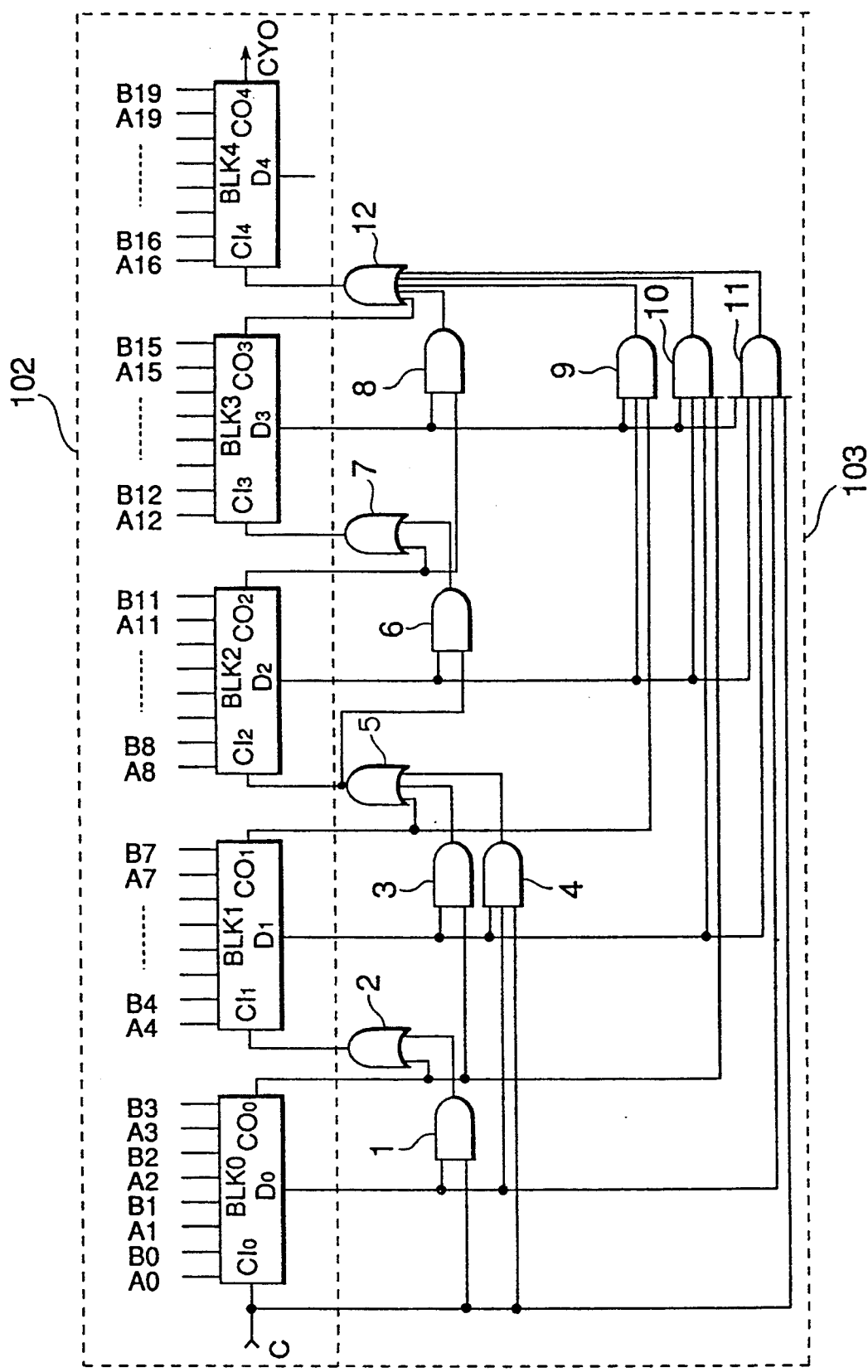
FIG. 3 is a block diagram of a carry lookahead circuit for a semiconductor integrated circuit according to one embodiment of the present invention.

A preferred embodiment of the present invention will now be described referring to the accompanying drawings. FIG. 3 presents a block diagram of a carry lookahead circuit for a semiconductor integrated circuit according to one embodiment of the present invention. An operation circuit 102 may comprise m arithmetic units; for the sake of simplification, m=5 in the following description.

As shown in FIG. 3, this carry lookahead circuit comprises an operation circuit 102, which has 20-bit input data A0 to A19 and B0 to B19 and performs a binary operation, and a carry lookahead circuit 103 which inputs lookahead carry signal to the carry input terminals of arithmetic units in the operation circuit 102 every four bits.

The operation circuit 102 includes the arithmetic unit BLK0, arithmetic unit BLK1, arithmetic unit BLK2, arithmetic unit BLK3 and arithmetic unit BLK4. The arithmetic unit BLK0 has eight data input terminals A0 to A3 and B0 to B3 to receive two pieces of 4-bit data, a carry input terminal $CI_0$, a carry output terminal $CO_0$ and a carry condition output terminal $D_0$. The arithmetic unit BLK1 has eight data input terminals A4–A7 and B4–B7 to receive two pieces of 4-bit data, a carry input terminal $CI_1$, a carry output terminal $CO_1$ and a carry condition output terminal $D_1$. The arithmetic unit BLK2 has eight data input terminals A8–A11 and B8–B11, a carry input terminal $CI_2$, a carry output terminal $CO_2$ and a carry condition output terminal $D_2$. The arithmetic unit BLK3 has eight data input terminals A12–A15 and B12–B15 to receive two pieces of 4-bit data, a carry input terminal $CI_3$, a carry output terminal $CO_3$ and a carry condition output terminal $D_3$. The arithmetic unit BLK4 has eight data input terminals A16–A19 and B16–B19 to receive two pieces of 4-bit data, a carry input terminal $CI_4$, a carry output terminal $CO_4$ (CYO) and a carry condition output terminal $D_4$.

Figure 2:
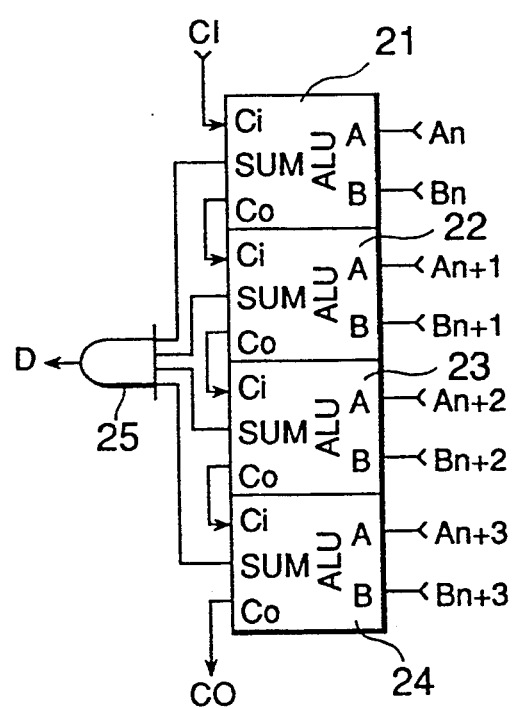
FIG. 2 is a block diagram showing arithmetic and logic units which constitute each arithmetic unit shown in FIGS. 1 and 3.

As shown in FIG. 2, the arithmetic units BLK0–BLK4 of the operation circuit 102 each comprise four ALUs 21 to 24 each having a data input terminal A, a data input terminal B, a carry input terminal Ci, a carry output terminal Co and an operation output terminal SUM. The carry output terminal Co of the first ALU 21 is connected to the carry input terminal Ci of the second ALU 22, the carry output terminal Co of the second ALU 22 to the carry input terminal Ci of the third ALU 23, and the carry output terminal Co of the third ALU 23 is connected to the carry input terminal Ci of the fourth ALU 24. The individual operation output terminals SUM are connected to the input terminals of an AND gate 25 whose output becomes a carry condition D. It is to be noted that the carry input terminal CI of each arithmetic unit BLK serves as the carry input terminal Ci of the first ALU while the carry output terminal CO of that arithmetic unit BLK serves as the carry output terminal Co of the fourth ALU.

The carry lookahead circuit 103 has its 0-th bit input carry signal line connected to the carry input terminal $CI_0$ of the arithmetic unit BLK0. The carry condition output terminal $D_0$ of the arithmetic unit BLK0 and the 0-th bit input carry signal line are connected to two input terminals of an AND gate 1. The carry output terminal $CO_0$ of the arithmetic unit BLK0 and the output terminal of the AND gate 1 are connected to two input terminals of an OR gate 2. The output terminal of the OR gate 2 is connected to the carry input terminal $CI_1$ of the arithmetic unit BLK1.

The carry condition output terminal $D_1$ of the arithmetic unit BLK1 and the carry output terminal $CO_0$ of the arithmetic unit BLK0 are connected to two input terminals of an AND gate 3. The carry condition output terminal $D_1$ of the arithmetic unit BLK1, the carry condition output terminal $D_0$ of the arithmetic unit BLK0 and the 0-th bit input carry signal line are connected to three input terminals of an AND gate 4. The carry output terminal $CO_1$ of the arithmetic unit BLK1, and the output terminals of the AND gates 3 and 4 are connected to three input terminals of an OR gate 5. The output terminal of the OR gate 5 is connected to the carry input terminal $CI_2$ of the arithmetic unit BLK2.

The carry condition output terminal $D_2$ of the arithmetic unit BLK2 and the output terminal of the OR gate 5 are connected to two input terminals of an AND gate 6. The carry output terminal $CO_2$ of the arithmetic unit BLK2 and the output terminal of the AND gate 6 are connected to two input terminals of an OR gate 7. The output terminal of the OR gate 7 is connected to the carry input terminal $CI_3$ of the arithmetic unit BLK3.

The carry condition output terminal $D_3$ of the arithmetic unit BLK3 and the carry output terminal $CO_2$ of the arithmetic unit BLK2 are connected to two input terminals of an AND gate 8. The carry condition output terminal $D_3$ of the arithmetic unit BLK3, the carry condition output terminal $D_2$ of the arithmetic unit BLK2 and the carry output terminal $CO_1$ of the arithmetic unit BLK1 are connected to three input terminals of an AND gate 9. The carry condition output terminal $D_3$ of the arithmetic unit BLK3, the carry condition output terminal $D_2$ of the arithmetic unit BLK2, the carry condition output terminal $D_1$ of the arithmetic unit BLK1, and the carry output terminal $CO_0$ of the arithmetic unit BLK0 are connected to four input terminals of an AND gate 10. The carry condition output terminal $D_3$ of the arithmetic unit BLK3, the carry condition output terminal $D_2$ of the arithmetic unit BLK2, the carry condition output terminal $D_1$ of the arithmetic unit BLK1, the carry condition output terminal $D_0$ of the arithmetic unit BLK0, and the 0-th bit input carry signal line are connected to five input terminals of an AND gate 11. The carry output terminal $CO_3$ of the arithmetic unit BLK3, and the output terminals of the AND gates 8, 9, 10 and 11 are connected to five input terminals of an OR gate 12. The output terminal of the OR gate 12 is connected to the carry input terminal $CI_4$ of the arithmetic unit BLK4.

The operation of the carry lookahead circuit according to this embodiment will be described below. Referring to the block diagram of the ALUs 21 to 24 which constitute the arithmetic unit BLK, the arithmetic units BLK1–BLK4 in the operation circuit 102 each comprise ALUs 21, 22, 23 and 24 as mentioned earlier. The ALUs 21 to 24 receive 4-bit data An to A(n+3) at input terminals A and 4-bit data Bn to B(n+3) at input terminals B, where n=0, 4, 8, 12, 16. The arithmetic units BLK1–BLK4 each receive a carry signal up to the previous bit, and the output of the AND gate 25, which is the logical product of the operation outputs SUM of the individual ALUs, serves as the carry condition output $D_0$, $D_1$, $D_2$, $D_3$ or $D_4$ for the previous bit. The carry output $CO_1$, $CO_2$, $CO_3$ or $CO_4$ resulting from the operation is output from the fourth ALU 24.

The lookahead carry signal from the preceding stage which is to be input to the carry input terminal $CI_1$ of the arithmetic unit BLK1 is looked ahead by the output of the OR gate 2 or the logical sum of the output of the AND gate 1, which is the logical product of the carry C input at the 0-th bit and the carry condition $D_0$ of the arithmetic unit BLK0, and the carry output $CO_0$ of the arithmetic unit BLK0.

The lookahead carry signal from the preceding stage which is to be input to the arithmetic unit BLK2 is looked ahead by the output of the OR gate 5 or the logical sum of the output of the AND gate 4, which receives as inputs the carry C input at the 0-th bit and the carry conditions $D_0$ and $D_1$ of the arithmetic units BLK0 and BLK1 respectively, the output of the AND gate 3, which receives as inputs the carry output $CO_0$ of the arithmetic unit BLK0 and the carry condition $D_1$ of the arithmetic unit BLK1, and the carry output $CO_1$ of the arithmetic unit BLK1.

The lookahead carry signal from the preceding stage which is to be input to the arithmetic unit BLK3 is looked ahead by the output of the OR gate 7 or the logical sum of the output of the AND gate 6, which is the logical product of the lookahead carry signal (output of the OR gate 5) for those bits up to the preceding stage, which is to be input to the arithmetic unit BLK2, and the carry condition $D_2$ of the arithmetic unit BLK2, and the carry output $CO_2$ of the arithmetic unit BLK2.

Figure 1:
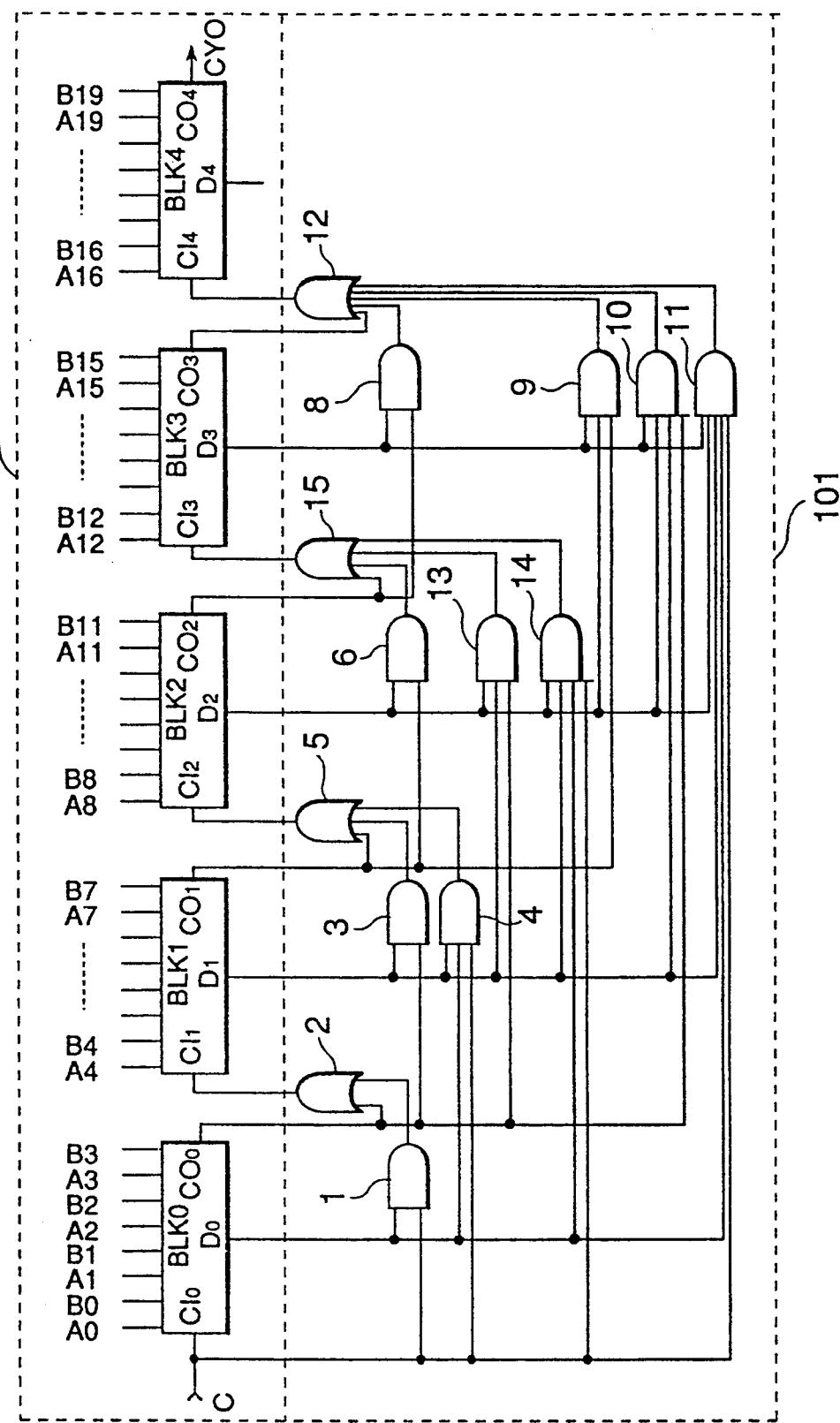
FIG. 1 is a block diagram of a conventional carry lookahead circuit for a semiconductor integrated circuit.

In the prior art circuit shown in FIG. 1, instead of the output of the OR gate 5, the carry output $CO_1$ of the arithmetic unit BLK1 is input to the AND gate 6. The output of the OR gate 5 is one input of the AND gate 6 in this embodiment. In the prior art, the OR gate 15 receives as its inputs the output of the AND gate 14, which is the logical product of the carry C input at the 0-th bit and the carry conditions $D_0$, $D_1$ and $D_2$ of the arithmetic units BLK0, BLK1 and BLK2 respectively, and the output of the AND gate 13, which is the logical product of the carry output $CO_0$ of the arithmetic unit BLK0 and the carry conditions $D_1$ and $D_2$ of the arithmetic units BLK1 and BLK2 respectively.

In this embodiment of the present invention, as described above, the input conditions of the OR gate 15 from the AND gates 13 and 14 are eliminated to provide a simpler circuit structure. In the circuit of this embodiment, the AND gate 6 provides the condition for the carry output $CO_1$ of the arithmetic unit BLK1 to travel through the arithmetic unit BLK2, the AND gate 13 provides the condition for the carry output $CO_0$ of the arithmetic unit BLK0 to travel through the arithmetic units BLK1 and BLK2, and the AND gate 14 provides the condition for the carry C input at the 0-th bit to travel through the arithmetic units BLK0, BLK1 and BLK2.

Those three conditions can be met by the input signal conditions of the OR gate 5 and the carry condition signal $D_2$ of the arithmetic unit BLK2, which is one input of the AND gate 6. Therefore, the looked-ahead carry to be input to the arithmetic unit BLK3 is slower than that of the prior art circuit. But, the carry to be input to the arithmetic unit BLK4 is critical to the operation speed of the carry lookahead circuit. Even if the AND gates 13 and 14 are omitted, therefore, the operation speed of the overall carry lookahead circuit will not become slower. In other words, the present invention has been developed in view of the very fact that the input conditions of the OR gate 15 from the AND gates 13 and 14 in the prior art circuit in FIG. 1 are given to increase the operation speed of the carry lookahead circuit and are not essential to the circuit structure.

With the operation circuit including m ($m \geq 4$) arithmetic units BLK, if the present invention is applied to the $(m-2)$-th carry lookahead circuit, immediately before the $(m-1)$-th circuit, $(m-3)$ AND gates can be reduced.

The carry from the preceding stage which is to be input to the arithmetic unit BLK4 is looked ahead by the output of the OR gate 12 or the logical sum of the output of the AND gate 11, which receives as its inputs the carry C input at the 0-th bit and the carry conditions $D_0$, $D_1$, $D_2$ and $D_3$ of the arithmetic units BLK0, BLK1, BLK2 and BLK3 respectively, the output of the AND gate 10, which receives as its inputs the carry output $CO_0$ of the arithmetic unit BLK0 and the carry conditions $D_1$, $D_2$ and $D_3$ of the arithmetic units BLK1, BLK2 and BLK3 respectively, the output of the AND gate 9, which receives as its inputs the carry output $CO_1$ of the arithmetic unit BLK1 and the carry conditions $D_2$ and $D_3$ of the arithmetic units BLK2 and BLK3 respectively, the output of the AND gate 8, which receives as its inputs the carry $CO_2$ of the arithmetic unit BLK2 and the carry condition $D_3$ of the arithmetic unit BLK3, and the carry output $CO_3$ of the arithmetic unit BLK3.

As described above, the conventional carry lookahead circuit 101 includes ten AND gates 1, 3, 4, 6, 8, 9, 10, 11, 13 and 14, and four OR gates 2, 5, 12 and 15, and has five fan-outs for the carry C input at the 0-th bit, four fan-outs for the carry output $CO_0$ of the arithmetic unit BLK0, three fan-outs for the carry output $CO_1$ of the arithmetic unit BLK1, two fan-outs for the carry output $CO_2$ of the arithmetic unit BLK2, one fan-out for the carry output $CO_3$ of the arithmetic unit BLK3, four fan-outs for the carry condition $D_0$, six fan-outs for the carry condition $D_1$, and four fan-outs for the carry condition $D_3$.

By comparison, the carry lookahead circuit 103 of the present embodiment includes eight AND gates 1, 3, 4, 6, 8, 9, 10 and 11, and four OR gates 2, 5, 7 and 12. Apparently, the number of the AND gates is reduced by two. Accordingly, there are four fan-outs for the carry C input at the 0-th bit, three fan-outs for the carry output $CO_0$ of the arithmetic unit BLK0, two fan-outs for the carry output $CO_1$ of the arithmetic unit BLK1, two fan-outs for the carry output $CO_2$ of the arithmetic unit BLK2, one fan-out for the carry output $CO_3$ of the arithmetic unit BLK3, three fan-outs for the carry condition $D_0$, four fan-outs for the carry condition $D_1$, four fan-outs for the carry condition $D_2$, and four fan-outs for the carry condition $D_3$. The number of fan-outs is also reduced. This design can minimize the chip-occupying area of the entire carry lookahead circuit, and can reduce the load capacitances of the carry outputs $CO_0$, $CO_1$, $CO_2$ and $CO_3$ of the individual arithmetic units BLK0–BLK3 respectively and the carry conditions $D_0$, $D_1$, $D_2$ and $D_3$ due to the reduced fan-outs.

The conventional circuit structure may be employed for a signal transfer path of a fast transfer rate, while the circuit structure of the present invention may be employed for a signal transfer path which does not need a fast transfer rate. Thus the operation speed of the overall carry lookahead circuit is prevented from being slower than that of prior art.

The foregoing description of this embodiment has been given with reference to the carry lookahead circuit for a 20-bit operation circuit. With a (4×n)-bit operation circuit, a carry lookahead circuit having fewer elements and a smaller load capacitance of signal transfer paths for the carry and the carry condition signal can be accomplished without delaying the operation speed of the overall carry lookahead circuit by properly combining the circuit structure of the present invention and that of the prior art.

What is claimed is:

1. A carry lookahead circuit for performing carry lookahead for every group of a plurality of bits of an operation circuit having m arithmetic units, m being a natural number equal to or greater than 4, the circuit comprising:

first carry signal generating means connected to and generating for each of a first arithmetic unit to a (m−2)-th arithmetic unit and a m-th arithmetic unit, a lookahead carry signal to be inputted to said each arithmetic unit, from a carry signal input at a 0-th bit, carry condition output signals and carry output signals, said carry condition output signals and said carry output signals being outputted from arithmetic units preceding said each arithmetic unit, respectively; and second carry signal generating means connected to and generating a lookahead carry signal to be inputted to a (m−1)-th arithmetic unit, from a lookahead carry signal to be inputted to said (m−2)-th arithmetic unit, a carry output signal of said (m−2)-th arithmetic unit and a carry condition output signal of said (m−2)-th arithmetic unit.

2. The carry lookahead circuit according to claim 1, wherein said second carry signal generating means includes:

an AND gate for providing a logical product of said lookahead carry signal to be inputted to said (m−2)-th arithmetic unit, and said carry condition output signal of said (m−2)-th arithmetic unit; and an OR gate for providing a logical sum of an output signal of said AND gate and said carry output signal of said (m−2)-th arithmetic unit, an output signal of said OR gate being outputted as said lookahead carry signal to be inputted to said (m−1)-th arithmetic unit.

3. The carry lookahead circuit according to claim 1, wherein, for a p-th arithmetic unit of said m arithmetic units, p being a natural number, said first carry signal generating means includes:

a first AND gate for providing a logical product of the carry signal input at the 0-th bit and carry condition output signals from said first arithmetic unit to a (p−1)-th arithmetic unit;

second AND gates being p−2 in number and provided for carry output signals of and being respectively connected to said first arithmetic unit to a (p−2)-th arithmetic unit, each of said second AND gates providing logical products of a carry output signal of a respective arithmetic unit of said first arithmetic unit to said (p−2)-th arithmetic unit and carry condition output signals from one of said arithmetic units which is next to said respective arithmetic unit to said (p−1) arithmetic unit; and an OR gate, coupled to said first AND gate and said second AND gates, for providing a logical sum of output signals of said first AND gate and said second AND gates and a carry output signal of said (P−1)-th arithmetic unit, an output signal of said OR gate being outputted as a lookahead carry signal to be inputted to said p-th arithmetic unit.

* * * * *